(12) United States Patent
Comstock et al.

(10) Patent No.: US 6,959,605 B2
(45) Date of Patent: Nov. 1, 2005

(54) INCREMENTAL PRESSURIZATION FLUCTUATION COUNTER AND METHODS THEREFOR

(75) Inventors: Shawn R. Comstock, Garland, UT (US); George R. Melvick, Ogden, UT (US); Alan L. Godfrey, Garland, UT (US)

(73) Assignee: Alliant Techsystems Inc., Edina, MN (US)

( * ) Notice: Subject to any disclaimer, the term of this patent is extended or adjusted under 35 U.S.C. 154(b) by 0 days.

(21) Appl. No.: 10/377,273

(22) Filed: Feb. 27, 2003

(65) Prior Publication Data

US 2004/0250626 A1 Dec. 16, 2004

(51) Int. Cl.⁷ .................................................. G01L 7/00
(52) U.S. Cl. ........................................................ 73/706
(58) Field of Search ...................... 73/862.381, 862.581, 73/862.582, 862.583, 862.584, 199 A, 706, 744, 753, 754, 756; 137/596, 625.68

(56) References Cited

U.S. PATENT DOCUMENTS

| | | | |
|---|---|---|---|
| 1,257,070 A | 2/1918 | Discher | |
| 1,287,258 A | 10/1918 | Discher | |
| 1,339,798 A | 5/1920 | Thompson | |
| 2,140,559 A | 12/1938 | Scully et al. | |
| 2,401,258 A | 5/1946 | Livers | |
| 3,608,581 A | 9/1971 | Sweet | |
| 3,783,742 A | 1/1974 | Kobelt | |
| 3,858,607 A | 1/1975 | Baker | |
| 3,937,912 A | 2/1976 | Martin | |
| 4,020,690 A | 5/1977 | Samuels et al. | |
| 4,155,261 A | 5/1979 | Hesse et al. | |
| 4,177,840 A | 12/1979 | Neff et al. | |
| 4,253,333 A | 3/1981 | Schneider | |
| 4,448,254 A | 5/1984 | Barrington | |
| 4,620,561 A | 11/1986 | Brewer | |
| 4,663,962 A | 5/1987 | Tagesson | |
| 4,766,928 A | * 8/1988 | Golestaneh | ................. 137/504 |
| 5,040,559 A | 8/1991 | Ewing | |
| 5,086,801 A | * 2/1992 | Peacock et al. | ................ 137/12 |
| 5,163,474 A | 11/1992 | Rizk | |
| 5,181,977 A | 1/1993 | Gneiding et al. | |
| 5,307,902 A | 5/1994 | Herrmann et al. | |
| 5,382,366 A | 1/1995 | Schwering et al. | |
| 5,517,008 A | 5/1996 | Francart, Jr. | |
| 5,520,214 A | 5/1996 | Mack et al. | |
| 5,535,790 A | 7/1996 | Hirz | |
| 5,650,575 A | 7/1997 | Heyse et al. | |
| 5,735,117 A | 4/1998 | Toelle | |
| 5,918,621 A | 7/1999 | Gilmore | |
| 5,965,822 A | 10/1999 | Wu | |
| 6,148,856 A | 11/2000 | Kropp | |
| 6,223,771 B1 | 5/2001 | Brown | |
| 6,257,287 B1 | 7/2001 | Kippe et al. | |
| 6,291,933 B1 | 9/2001 | Dombrowski et al. | |
| 6,340,357 B1 | 1/2002 | Poulsen et al. | |

* cited by examiner

*Primary Examiner*—William Oen
(74) *Attorney, Agent, or Firm*—TraskBritt

(57) ABSTRACT

Apparatus for repeatedly indicating incremental pressure fluctuations and methods employing same are disclosed. A chamber may be sealed at an initial pressure and configured to respond to a pressure difference between the initial pressure and subsequent pressure within a container. The container may be filled via a valve mechanism exhibiting a first operational state that may allow for entry of material into the container while sealing the chamber at the initial pressure of the container as it began to be filled. A movable element communicating with the sealed chamber and the container may respond to a pressure differential therebetween, thus causing an indicator to indicate an incremental pressure fluctuation. The valve mechanism may exhibit a second operating state that may allow for the chamber and container pressures to be substantially equalized.

76 Claims, 9 Drawing Sheets

INCREMENTAL PRESSURIZATION FLUCTUATION COUNTER AND METHODS THEREFOR

BACKGROUND OF THE INVENTION

1. Field of the Invention

The present invention relates generally to apparatus for measuring and indicating incremental pressure fluctuations experienced within a closed system. More specifically, the present invention relates to an apparatus and method for measuring and indicating incremental pressure fluctuations within a container, tank, or pressure vessel.

2. State of the Art

Pressurized containers and/or tanks are used for a multitude of different applications and are typically filled, at least partially emptied, and refilled over and over again. As known in the art, the pressure within a closed container relates to the stress developed therein. So-called hoop stresses as well as axial stresses develop within a closed container due, in part, to the pressure therein. Since pressurized containers may be subjected to varying pressures (and, thus, varying stresses) by way of repeated emptying and filling, it may be advantageous to monitor, measure, and record incremental pressure fluctuations therein.

Moreover, stresses and, more particularly, cyclic stresses are known to cause failure in metals and other materials at stress levels considerably below their tensile strength. Typically, materials may be tested by applying a cyclic stress (via a rotating beam or other test protocol) and measuring the number of fluctuations that occurs before failure of the material. Materials may exhibit an endurance limit or endurance strength indicating a stress level below which the material will theoretically never fail.

However, many other considerations may influence the fatigue life of a closed container or tank. For instance, corrosion and initial surface finish of the materials used to fabricate the container may influence the ultimate strength and fatigue strength thereof. In addition, welds may be commonly used to fabricate tanks or containers and may be subject to particular fatigue and stress considerations. Thermal stresses and temperature influences may also affect the ultimate life of a pressurized container or tank as well.

Therefore, it may be useful to determine the number of times a particular magnitude of incremental pressure fluctuation is experienced within a closed container or tank by way of an incremental pressurization fluctuation counter. Such knowledge may be used to determine life expectancy, maintenance, repair, or inspection. Determining incremental pressure fluctuations may be advantageous over prior art approaches for indicating pressure fluctuations.

Containers may be filled and refilled at various times and under various conditions and therefore may experience various pressure changes or fluctuations. Such a container may be partially empty and at some initial pressure prior to filling. After filling, the container exhibits an increase in pressure. Of course, the overall change in pressure during filling may depend on environmental factors, such as temperature. Thus, the pressure change within the container depends on the initial pressure within the container as well as the pressure within the container after filling. Since the process of filling a container is normally not precisely controlled, the initial pressure as well as the pressure after filling may be variable. Therefore, it may be desired to measure relative or incremental pressure fluctuations during filling of a container in a simple, efficient manner.

Further, only relatively rapid pressure changes may be of interest, so that the slow emptying of the container may not be desired to be recorded or indicated. Alternatively, only pressure changes that occur during the filling of the container may be of interest.

Prior art approaches have described mechanisms to measure pressures, and even count pressure magnitudes within containers; however, the prior art does not disclose an incremental pressurization fluctuation counter. Thus, prior art approaches may record or otherwise indicate pressure cycles due to emptying of the container, or due to relatively slow changes in pressure, such as due to temperature changes.

U.S. Pat. No. 4,155,261 to Hesse et al. describes an arrangement for registering pressure fluctuations in a pressure system wherein a spring-biased piston may engage and move a free-wheeling clutch and thereby register an amount of pressure fluctuation according to the spring constants and the relationship between the rotation of the clutch and movement of the piston.

U.S. Pat. No. 5,517,008 (the '008 patent) to Francart, Jr. describes a mechanical fluctuation counter for counting fluctuations of a steam-powered liquid pump. More specifically, the '008 Patent describes a movable piston that may be biased toward a counter mechanism by pressurized steam and thereby engage the counter mechanism. Further, a compression spring may be used to bias the piston away from the counter in the absence of sufficient steam pressure. Each fluctuation being counted includes an increase, then a decrease, of pressure against the movable piston. The piston is extended on a piston rod against steam or gas pressure by a coil spring concentrically surrounding the piston rod. The free end of the piston rod drives a mechanical counter. No assist to the spring force is provided by sealing an initial pressure in communication with the piston.

In view of the foregoing, an incremental fluctuation counter which improves on conventional fluctuation counters and eliminates some of their respective disadvantages would be desirable.

BRIEF SUMMARY OF THE INVENTION

The present invention comprises an apparatus for measuring and indicating incremental pressure fluctuations within a closed container or tank. The invention would be useful, among other things, in defining the life of a pressure vessel or container, or for indicating the timeliness of maintenance, inspection, or repair. Generally, a movable element may be caused to indicate an incremental pressure fluctuation above a selected magnitude. More specifically, the apparatus of the present invention comprises an indicator for indicating repeated, incremental pressurization of a container, the incremental pressurization fluctuation counter including a chamber sealed at an initial pressure via a valve mechanism exhibiting a first operational state that allows for entry of material into the container while preventing the container from communicating with the chamber. A movable element in communication with the sealed chamber and with the container as it is filled responds to the pressure differential therebetween, thus causing an indicator to indicate an incremental pressure fluctuation of at least a selected magnitude. Subsequent to the causing of the indicator to indicate an incremental pressure fluctuation, the valve mechanism may exhibit a second operational state in which the container pressure and the chamber pressure are allowed to communicate with one another and, thus, substantially equalize. Providing such equalization allows for the incremental pressurization fluctuation counter to be responsive to subsequent increases in pressure within the container, thus indicating repeated incremental pressure fluctuations of at least a selected magnitude.

In one embodiment, the incremental pressurization fluctuation counter may include a movable element comprising a piston biased by way of a biasing element, the piston forming a portion of a sealed chamber responsive to a predetermined pressure differential between the pressure within the chamber plus the biasing force and the pressure within the associated container. The piston stroke may drive a mechanical counter to indicate a pressure increase in the container of the predetermined pressure differential. After the movable element completes a count stroke by moving a minimum amount to cause the indicator to increment, pressure within the chamber may be equalized with the pressure in the container through movement of a shuttle valve biased via a biasing member with that within the container in preparation for another increase in container pressure. Thus, the spring force of the biasing element as well as the indicator may be selected and configured to respond according to the desired minimum pressure increment to be measured, since the chamber and associated container pressures may be balanced at the end of each count stroke. An incremental pressurization of the container of less than the predetermined pressure differential may not initiate a count stroke. In addition, an incremental pressurization of more than the predetermined pressure differential (while the container pressure exceeds the chamber pressure) may not initiate more than one count stroke because the movable element and indicator may be configured so that a subsequent incremental pressure fluctuation may be indicated only subsequent to the pressure within the chamber and container becoming substantially equalized, or attaining a sufficiently low difference.

The movable element may comprise a number of embodiments. For instance, the movable element may comprise a membrane, a multidiameter piston, a deformable element such as a balloon, or another pressure-sensitive element that moves in response to a pressure differential between the container and a sealed chamber. In addition, the indicator may comprise an electronic and/or mechanical device that displays, records, memorializes, and/or otherwise measures the number of incremental pressure fluctuations experienced by the container in relation to an initial pressure sealed within the chamber at the beginning of each increase in pressure in the container, such as during filling of the container.

In another embodiment, the valve mechanism may include a shuttle valve comprising a piston or annular piston biased via a biasing member forming a portion of the sealed chamber responsive to a predetermined pressure differential between the pressure within the filling port and a biasing force and the pressure within the associated container. The movable element may comprise a piston biased by way of a biasing element and configured to drive an indicator for displaying incremental pressure fluctuations in the container of at least a selected pressure differential magnitude. After the movable element completes a count stroke, the indicator is incremented, and pressure within the chamber may be equalized through movement of the shuttle valve with that within the container in preparation for another incremental increase in container pressure. The biasing element and biasing member may act upon the movable element in combination or separately. In addition, the valve mechanism may be retained in a first operational state for a minimum amount of time after filling ceases (or based on another operational state) to prevent the pressure within the container and the pressure within the chamber from equalizing. Doing so may prevent the incremental pressurization fluctuation counter from being overly sensitive to incremental pressure fluctuations during filling of the container, or interruptions in filling of the container. Of course, the valve mechanism may include separate valves for each aperture or port within the system, which may be controlled independently to achieve a particular operational characteristic.

The biasing member and/or biasing element may comprise compression, tension, washer, Belleville, or torsion springs and may comprise other biasing elements as known in the art. Further, since the chamber is sealed from the container and communicates with a movable element, a backpressure may develop within the chamber in response to such motion. Therefore, the biasing element may comprise a pressure developed within the chamber in response to the motion of the movable element.

In a further embodiment, the incremental pressurization fluctuation counter may be positioned outside of the container and the movable element may communicate with the container by way of a passage, port, or pressure line as known in the art. Thus, the valve mechanism may be located remotely in relation to the container and the chamber. In addition, the movable element may be located remotely from the chamber, so long as the chamber may communicate pressure thereto.

Features from any of the above-mentioned embodiments may be used in combination with one another in accordance with the present invention. In addition, other features and advantages of the present invention will become apparent to those of ordinary skill in the art through consideration of the ensuing description, the accompanying drawings, and the appended claims.

BRIEF DESCRIPTION OF THE SEVERAL VIEWS OF THE DRAWINGS

In the drawings, which illustrate what is currently considered to be the best mode for carrying out the invention.

DETAILED DESCRIPTION OF THE INVENTION

Figure 1A:
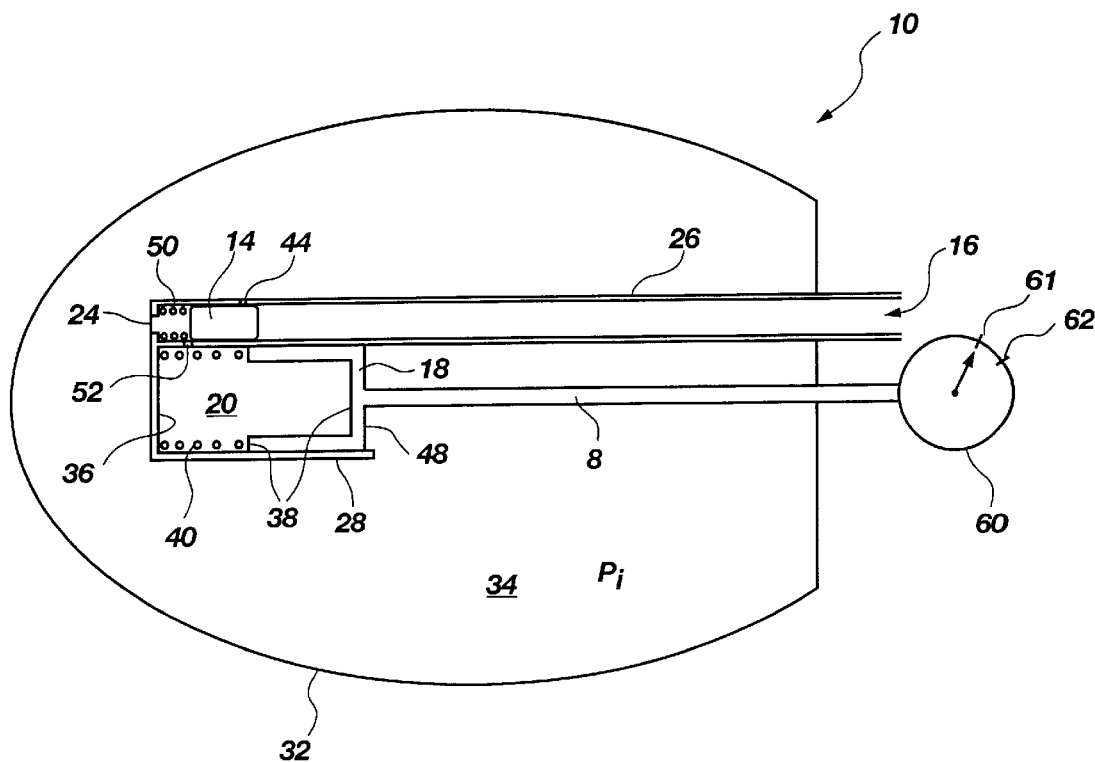
FIG. 1A is a schematic side cross-sectional view of an embodiment of an incremental pressurization fluctuation counter of the present invention.

FIG. 1A shows a schematic side cross-sectional view of an exemplary embodiment of an incremental pressurization fluctuation counter 10 of the present invention. Incremental pressurization fluctuation counter 10 comprises a movable element 18 operably attached via extending element 8 to an indicator 60. Movable element 18 and extending element 8 may be integrally formed or otherwise configured so that the motion of movable element 18 is transmitted to the indicator 60. Indicator 60 may be configured to display, record, or otherwise memorialize the number of times movable element 18 is displaced, wherein such displacement may be related to the incremental pressure variance of container 32 in relation to a sealed chamber 20. As used herein, "indicating an incremental pressure fluctuation" includes displaying, recording, or otherwise memorializing the incremental pressure fluctuation. Indicator 60 may include a first indicium 61 and a second indicium 62 for indicating incremental pressure fluctuations experienced within container 32. Further, indicator 60 may comprise mechanical and/or electronic apparatus for indicating incremental pressure fluctuations experienced by container 32. Knowledge of the incremental pressure fluctuations experienced within a pressurized container may be desirable for predicting the life of, maintaining, inspecting, or repairing the container 32.

Generally, the movable element 18 may be positioned by way of a biasing element 40, which may comprise a spring as shown in FIG. 1A. In FIG. 1A, the initial pressure $P_i$ in the container chamber 34 communicates with the chamber 20 through vent aperture 24 and chamber aperture 52. "Communicate," as used herein, means that hydraulic or pneumatic pressure or force is transmitted or experienced. However, as may be seen from FIG. 1A, if a pressure difference is developed between the pressure within chamber 20 and the pressure within the container chamber 34, the movable element 18 may be displaced by way of the difference in the pressures acting on surface 38 and surface 48 of movable element 18. Typically, the pressure within the container 32 may be increased incrementally over the pressure within the chamber 20 when the container 32 is filled while the chamber 20 is isolated from the pressure within container 32. Stated another way, a relatively lower initial pressure is sealed within chamber 20 while the container chamber 34 is filled and increases in pressure, thus displacing the movable element 18 against the biasing element 40. Of course, over the lifetime of container 32, the initial conditions that a container 32 exhibits may vary and the incremental pressure fluctuation magnitudes that may occur may also vary. For instance, $P_i$, an initial pressure at which the container begins to be refilled, may vary according to temperature, type of material within the container, and other considerations. Therefore, since $P_i$ may vary, it may be advantageous to implement an incremental pressurization fluctuation counter to measure the number of times the container 32 experiences an incremental change in pressure greater than a selected magnitude.

Container 32 is shown in FIG. 1A at initial pressure $P_i$ and movable element 18 is positioned toward indicator 60 by way of biasing element 40. Biasing element 40 may be slightly compressed and movable element 18 may be retained within housing 28 by way of stops (not shown) that may prevent the movable element 18 from being positioned undesirably by matingly engaging the movable element 18 or as otherwise known in the art. For instance, stops (not shown) may prevent the movable element 18 from exiting the cavity formed by housing 28. Further, stops (not shown) may prevent movable element 18 from compressing biasing element 40 excessively between surface 38 of the movable element 18 and surface 36 of housing 28.

Figure 2A:
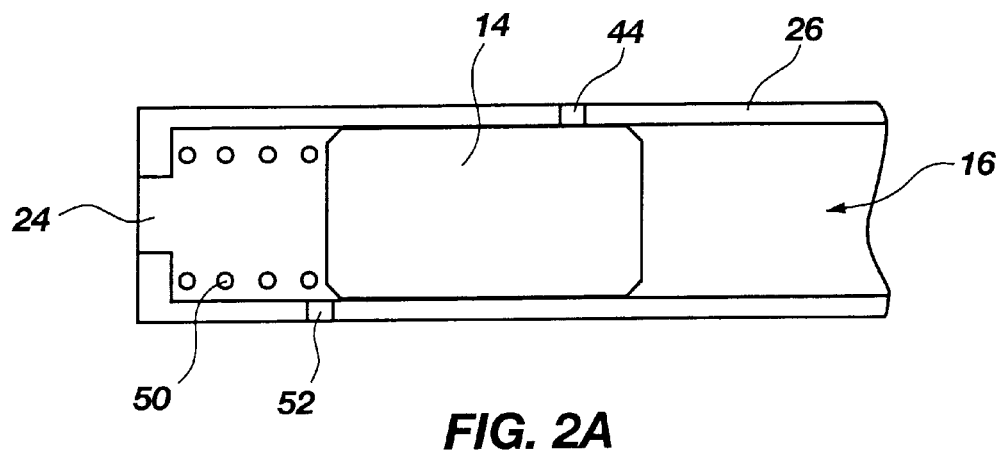
FIGS. 2A–2C are enlarged schematic side cross-sectional views of the shuttle valve assemblies as shown in FIGS. 1A and 1B in different operational states.
Figure 2B:
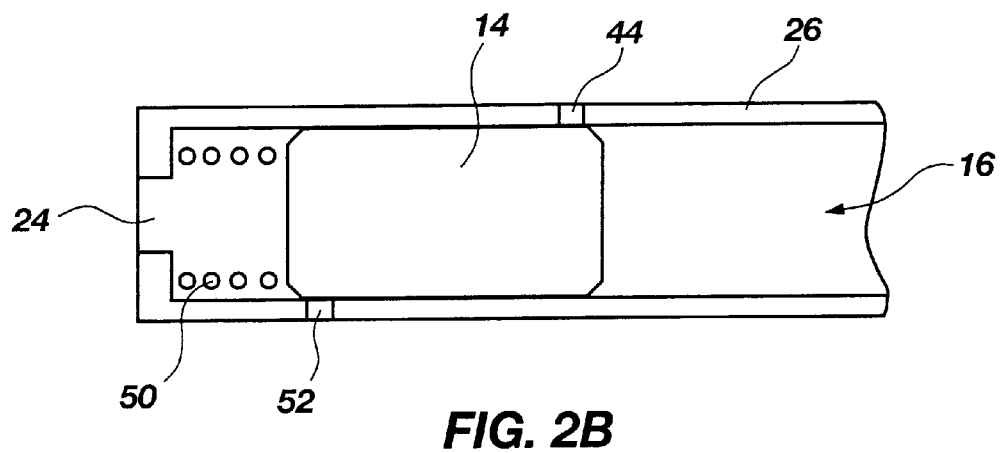
Figure 2C:
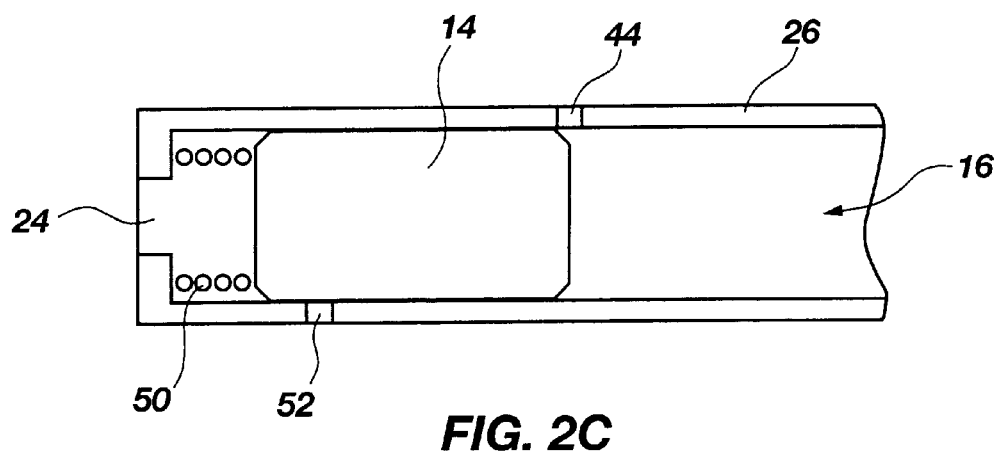

The initial pressure $P_i$ within container 32 may communicate with the chamber 20 by way of vent aperture 24 and chamber aperture 52 when the shuttle valve 14 is positioned as shown in FIG. 1A. However, shuttle valve 14 may be configured to allow the container 32 to be filled while isolating chamber 20 when the shuttle valve 14 is in a different position. More specifically, FIGS. 2A–2C show schematic cross-sectional views of the shuttle valve 14 shown in FIG. 1A within tube 26 in various lateral positions during operation. Illustratively, when the fill port 16 is not being used to fill the container 32, the biasing member 50 positions the shuttle valve 14 so that chamber aperture 52 may communicate with vent aperture 24 as shown in FIG. 2A and FIG. 1A. Thus, the chamber 20 and the container chamber 34 may experience substantially the same pressure. However, as pressure builds within fill port 16, the shuttle valve 14 may be displaced against biasing member 50 and may seal chamber 20 by blocking chamber aperture 52 as shown in FIG. 2B. As known in the art, the shuttle valve 14 may include sealing members such as gaskets, O-rings, and/or other sealing members to isolate the chamber 20 and container chamber 34 from one another. As may be seen in FIG. 2B, the fill aperture 44 may also be blocked while the chamber aperture 52 is blocked. Upon further increasing pressure within the fill port 16 over the pressure at which the shuttle valve 14 is positioned as shown in FIG. 2B, shuttle valve 14 may be laterally displaced so that fill aperture 44 allows the pressure within fill port 16 to communicate with the container chamber 34. Thus, the shuttle valve 14 may be utilized to allow the container chamber 34 to communicate with either the fill port 16 or the chamber 20 in the manner described above.

Of course, the shuttle valve 14 may be configured in a multitude of different ways. For instance, the shuttle valve 14 may be configured as a solenoid valve that may be electrically actuated. Alternatively, the shuttle valve 14 may be configured as a manual valve that is actuated by displacement of an actuating mechanism. Further, the shuttle valve 14 may be configured with stops or otherwise constrained to prevent it from damaging the biasing member 50 or from being displaced undesirably. For example, it may be desired to prevent the shuttle valve 14 shown in FIG. 1A from being positioned laterally proximate the end of the fill port 16 that extends outside the container 32 because, upon introducing pressure to the fill port 16, the shuttle valve 14 may acquire sufficient momentum to damage the biasing member 50, stops (not shown), fill port 16, or the shuttle valve 14 itself.

In addition, it may be desired to configure the shuttle valve 14 so that once the chamber 20 is sealed, the shuttle valve 14 remains in an operating state, preventing the chamber 20 from communicating with any other pressure port or pressure source that differs therefrom for a certain amount of time, regardless of pressures within the fill port 16, container 32, or container chamber 34. Doing so may allow for the filling of the container 32 to be interrupted for an amount of time without equalizing the pressures within container chamber 34 and the chamber 20, thus maintaining the possible indication of an incremental pressure fluctuation. Similarly, the shuttle valve 14 may be configured so that the flows through the chamber aperture 52 and the fill aperture 44 are independently controlled via independent valve systems. Thus, the shuttle valve 14 may be configured to seal the chamber 20 for a minimum amount of time, regardless of the pressures or status of other apertures or elements within the system.

Figure 3A:
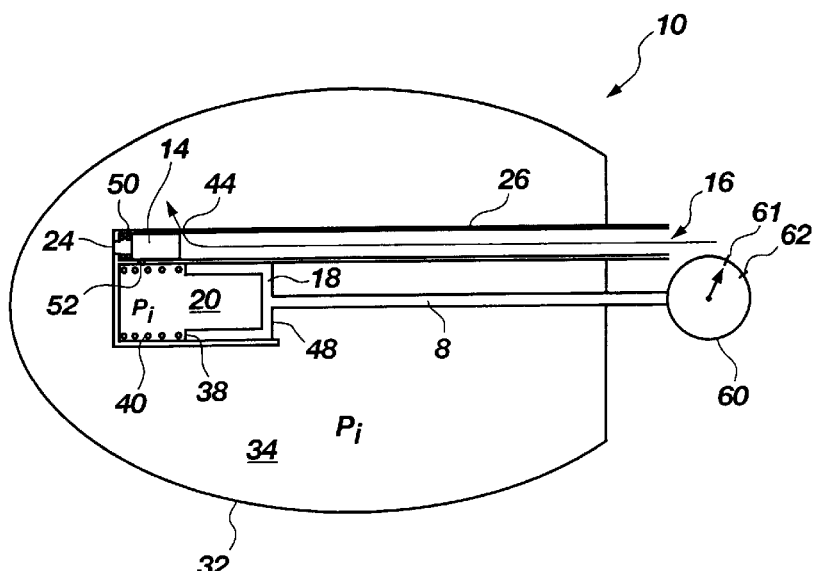
FIGS. 3A–3C are side cross-sectional views of the embodiment of an incremental pressurization fluctuation counter as shown in FIG. 1A in different operational states.
Figure 3B:
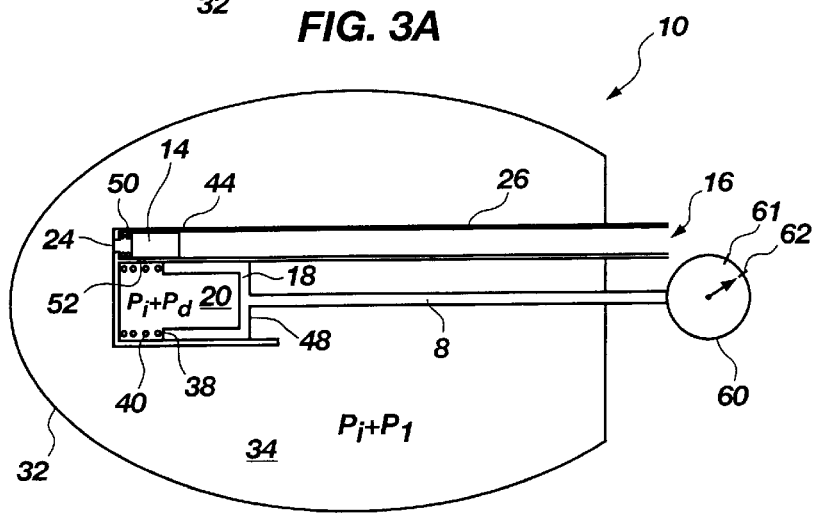
Figure 3C:
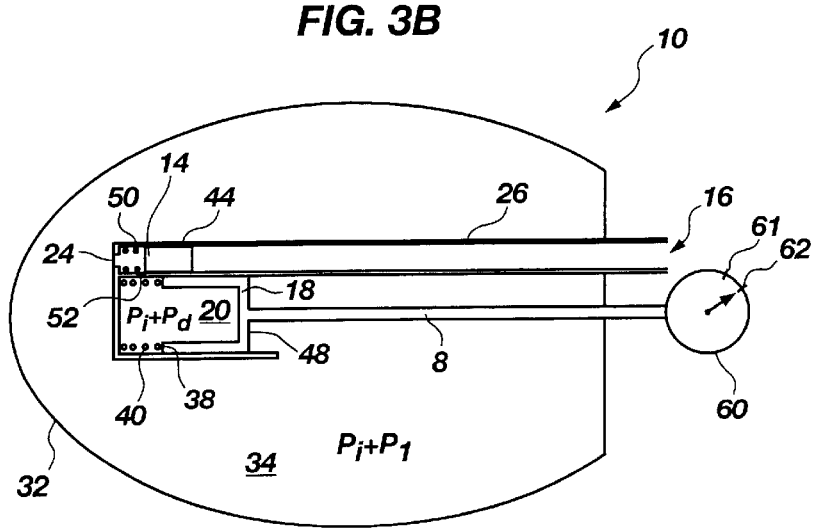

Turning to FIGS. 3A–3C, each is a schematic representation of the incremental pressurization fluctuation counter 10 shown in FIG. 1A under different conditions during operation. FIG. 1A shows the incremental pressurization fluctuation counter 10 while the container 32 is not being filled. Prior to filling the container 32, fill port 16 may be slightly pressurized, as shown in FIG. 2B, but not sufficiently pressurized to position shuttle valve 14 against biasing member 50 so that the fill aperture 44 is not blocked thereby. Alternatively, the fill port 16 may not be pressurized whatsoever. Upon sufficient pressure developing within fill port 16, shuttle valve 14 may be displaced thereby against biasing member 50 to position the shuttle valve 14 to block chamber aperture 52 so that chamber 20 is sealed while the container chamber 34 may be filled by material entering fill port 16 and passing through fill aperture 44 as FIG. 3A illustrates. Thus, assuming the pressure within fill port 16 exceeds the initial pressure $P_i$, the pressure within container chamber 34 increases. As shown in FIG. 3B, the increase in pressure within container chamber 34 may be shown as the sum of initial pressure $P_i$ and pressure $P_1$. Since the sum of $P_i$ and $P_1$ acts upon the surface 48 of movable element 18, movable element 18 may be displaced inwardly in relation to chamber 20, thus compressing the gas therein as well as the biasing element 40. Therefore, the increase in pressure within the chamber 20, shown as $P_d$, may occur in relation to the amount of force exerted by the pressure acting upon surface 48, the area of surface 48 and surface 38, as well as the biasing force generated by the displacement of movable element 18 laterally toward biasing element 40. As the movable element 18 reaches a preselected position that may be designed to correspond with a selected pressure differential between the pressure within chamber 20 and the sum of pressures $P_i$ and $P_1$, the indicator 60 may be incremented via extending element 8 accordingly in that the indicator may indicate the incremental pressure fluctuation by incrementing from a first indicium 61 to a second indicium 62 as shown in FIG. 3B.

Thus, the biasing element 40 and movable element 18 may be sized, positioned, and configured so that the indicator is incremented only upon the container chamber 34 experiencing an incremental pressure fluctuation of a selected magnitude. In other words, the incremental pressurization fluctuation counter 10 may be configured so that incremental pressure fluctuations below a particular magnitude do not register on the indicator 60. Such a system may be advantageous when pressure fluctuates within container chamber 34 due to temperature, due to expelling the contents of the container chamber 34, and/or due to other considerations. Thus the incremental pressurization fluctuation counter 10 of the present invention may be configured to indicate incremental pressure fluctuations under particular conditions. Of course, indicia 61 and 62 shown in FIGS. 1A, 1B and 3A–3C are merely illustrative, and the actual indicia may be scaled in relation to thousands of fluctuations, or may simply become visible after a selected number of incremental pressure fluctuations.

Indicator 60 may be configured so that it may not increment again until the difference in pressure between container chamber 34 and the chamber 20 falls below a selected trigger pressure. Put another way, the indicator 60 and movable element 18 may be configured so that the movable element 18 must return to a position that corresponds to a relatively low pressure difference between container chamber 34 and chamber 20 before the indicator 60 will increment additionally. Thus, the incremental pressurization fluctuation counter of the present invention may indicate a number of incremental pressure fluctuations of at least a minimum magnitude subsequent to the pressure difference between the container chamber 34 and chamber 20 being relatively low. Incremental pressure fluctuations that are larger in magnitude than the minimum magnitude may also cause the incremental pressurization fluctuation counter of the present invention to increment. Incremental pressure fluctuations that are smaller in magnitude than a selected magnitude may not cause the indicator 60 to increment. It is contemplated by the present invention that incremental pressurization fluctuation counters configured to indicate differing magnitudes of incremental pressure fluctuations may be used in combination with one another or integrated with one another if desired. It is further contemplated by the present invention that the incremental pressurization fluctuation counter of the present invention may be configured to indicate differing ranges of incremental pressure fluctuation magnitude.

As filling ceases and the pressure within fill port 16 decreases, the biasing member 50 may cause the shuttle valve 14 to move laterally away from the biasing member 50 and thereby may open chamber aperture 52 and seal fill aperture 44 as shown in FIG. 3C. Opening the chamber aperture 52 may allow pressure within container chamber 34 to communicate with chamber 20 via vent aperture 24 and may cause, in conjunction with biasing element 40, the movable element 18 to move toward its initial position as shown in FIG. 1A. However, movable element 18, as shown in FIG. 3C, is shown as chamber aperture 52 is opened, and movable element 18 is biased against biasing element 40. As the differential pressure between the container chamber 34 and the chamber 20 is substantially equalized, the movable element 18 returns to its lateral position as shown in FIG. 1A. Thus, the incremental pressurization fluctuation counter 10 of the present invention may be reset, so that incremental pressure fluctuations (above a selected magnitude) due to separate temporal filling operations may be indicated.

Further, the biasing element 40 may be configured to be in tension rather than in compression as shown in FIGS. 1A, 1B, and 2A–2C. Such a configuration may be useful for ease in replacement of a damaged biasing element 40 or modification of the incremental pressurization fluctuation counter 10 to indicate a different incremental pressure range. Similarly, biasing member 50 may also be configured to act upon the shuttle valve 14 in tension rather than in compression. As to either biasing element 40 or biasing member 50, many configurations are known in the art for biasing in general, such as gas pistons, torsional springs, deflected beams, bladders, elastic members, and so on. Accordingly, any biasing configuration known in the art may be utilized to implement the biasing element 40 and biasing member 50 of the present invention. Calibration mechanisms such as threaded elements or pressure regulators that allow for control over the biasing force may be implemented as well.

In addition, it may be possible to configure the movable element 18 so that it returns without an external biasing element. One such configuration may be when the movable element 18 comprises a deformable membrane isolating the container chamber 34 from the chamber 20 and vice versa. The membrane may be deformed due to a relatively lower pressure within chamber 20 in relation to a relatively higher pressure within container chamber 34 and thereby may cause indicator 60 to increment. Upon substantial equalization between the pressure within chamber 20 and container chamber 34, the membrane may resiliently return by virtue of the resilient properties thereof.

Figure 1B:
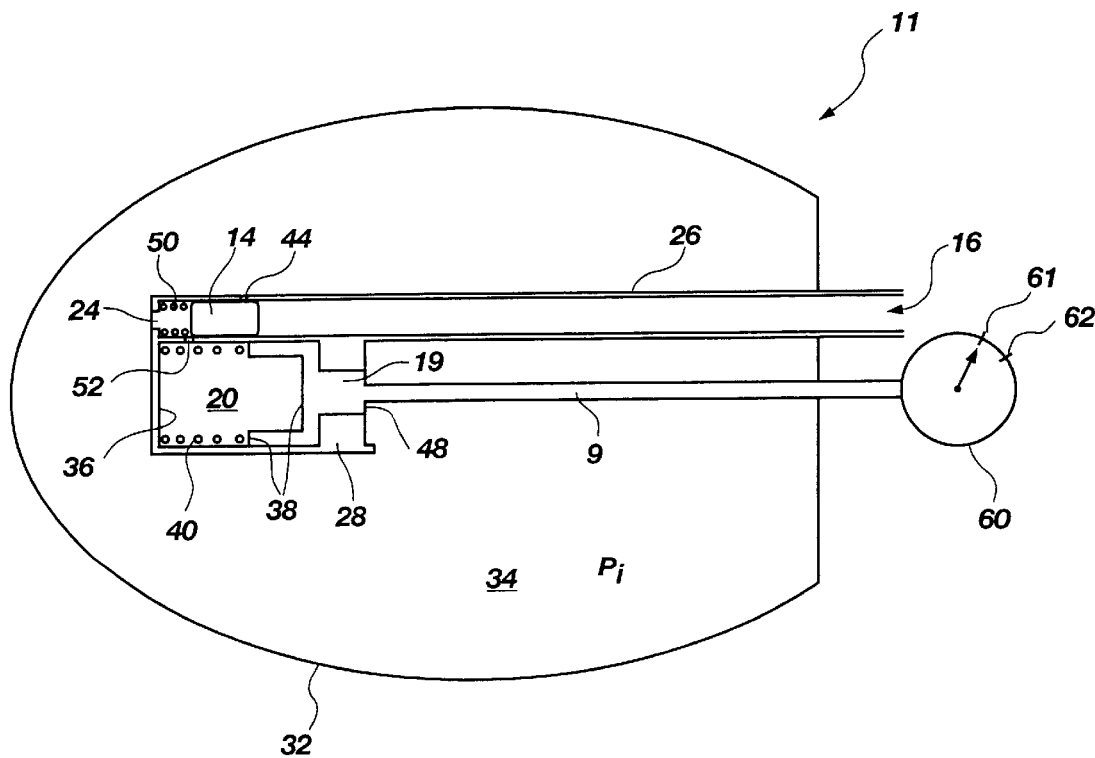
FIG. 1B is a schematic side cross-sectional view of an embodiment of an incremental pressurization fluctuation counter of the present invention.

Alternatively, it may be possible to configure a movable element as a bi-diameter piston so that when pressures are substantially equal on either side of the piston, the piston is biased in a particular direction. In general, the movable element may be configured as any multidiameter piston, i.e., a piston having more than one diameter. FIG. 1B shows an incremental pressurization fluctuation counter 11 of the present invention wherein the area of surface 38 of movable element 19 is larger than the area of surface 48. Thus, when chamber 20 is sealed from the container chamber 34, pressure within the container chamber 34 must be greater than the pressure within chamber 20 in order to cause the movable element 19 to move inwardly toward biasing element 40, thereby compressing biasing element 40 between surface 38 and surface 36 and moving the extending element 9 affixed to indicator 60. As may be apparent from inspection of FIG. 1B, the relationship between the pressures in container chamber 34 and chamber 20, the area of surface 38, the area of surface 48, and the biasing properties of biasing element 40 may, at least in part, determine the behavior of the movable element 19 during operation. Further, the area of surface 38, the area of surface 48, and the biasing properties of biasing element 40 may be tailored to achieve an operational characteristic. For instance, since the initial pressure sealed within chamber 20 may affect the ultimate deflection of movable element 19 during an increase of pressure in the container 32, it may be possible to configure the area of surface 38 and the area of surface 48 to reduce the effect of the initial pressure so that the biasing element 40 dominates the deflection of the movable element 19 during an incremental pressure fluctuation. The general operation of the incremental pressurization fluctuation counter 11 is analogous to the operation of the incremental pressurization fluctuation counter 10 shown in FIG. 1A. Therefore, FIGS. 3A–3C also generally illustrate the operation of incremental pressurization fluctuation counter 11 except for the different configuration of the movable element 19. Other labeled elements in FIG. 1B are numbered according to the elements as described in FIG. 1A.

Although the embodiments of the present invention are configured to indicate an incremental pressurization fluctuation wherein the pressure within a container exceeds the pressure within a sealed chamber, the present invention is not so limited. For instance, the incremental pressurization fluctuation counter of the present invention may be configured to indicate pressure fluctuations wherein the pressure within the chamber is greater than the pressure within the container chamber. Such a configuration may be desired if the pressure within the container decreases repeatedly due to expelling of the contents thereof. Such a configuration may simply substantially equally pressurize a chamber and container during filling, thereby biasing the movable element against a biasing element, then seal the chamber from the container. As the pressure within the container decreases, the movable element is displaced, thereby causing the indicator to indicate an incremental pressurization fluctuation. The operation of such a configuration may be analogously tailored to each embodiment herein described.

Figure 4A:
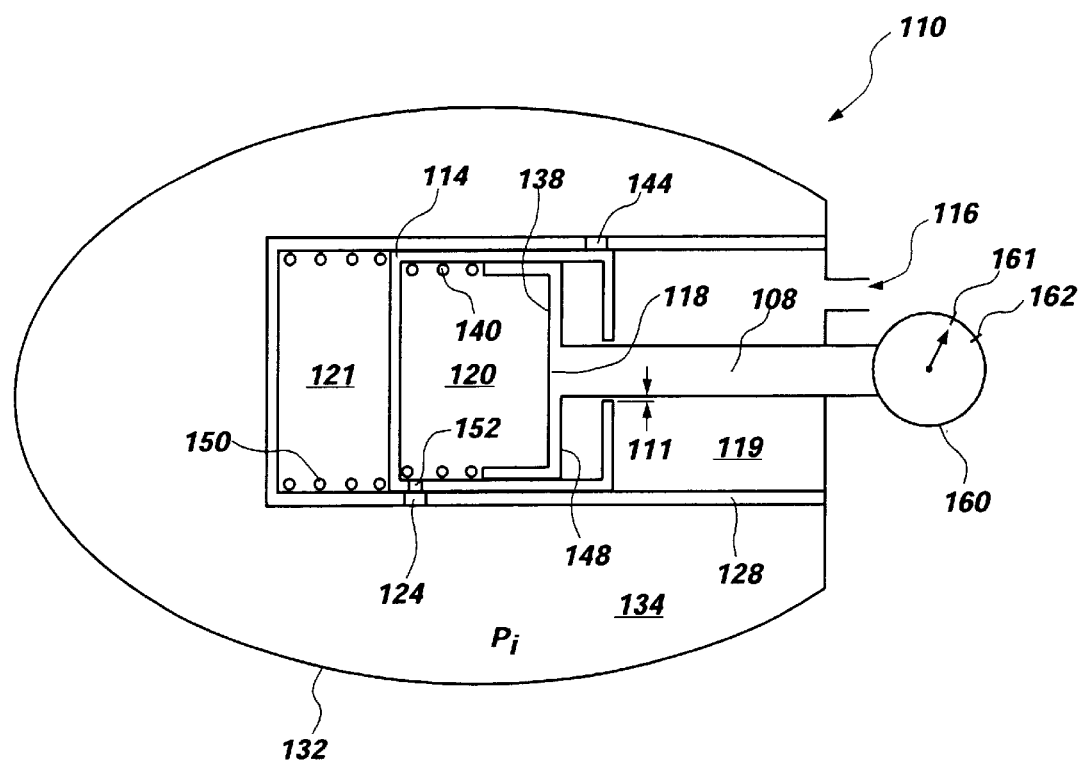
FIG. 4A is a schematic side cross-sectional view of an embodiment of an incremental pressurization fluctuation counter of the present invention.

FIG. 4A shows a cross-sectional schematic view of an alternative embodiment of the incremental pressurization fluctuation counter 110 of the present invention. As shown in FIG. 4A, shuttle valve 114 may form at least a portion of the chamber 120 in which movable element 118, operably coupled to indicator 160 via extending element 108, may be disposed. Fill port 116 provides an inlet for filling the container 132 so long as fill aperture 144 is not blocked by the shuttle valve 114. Housing 128 may form a portion of chamber 120 and may also be configured with stops (not shown) to limit the relative position(s) of the shuttle valve 114 and/or the movable element 118. Biasing element 140 may matingly engage and position movable element 118 during operation, as biasing member 150 may matingly engage and position shuttle valve 114 during operation. Gaskets, seals, or other sealing techniques as known in the art may be employed to inhibit hydraulic/pneumatic communication between the chamber 120, the container chamber 134, and fill port 116 according to the operation of incremental pressurization fluctuation counter 110 as described herein.

Figure 5A:
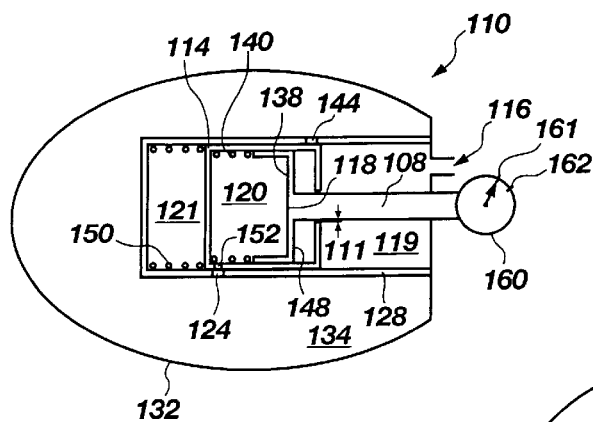
FIGS. 5A–5E are side cross-sectional views of the embodiment of an incremental pressurization fluctuation counter as shown in FIG. 4A in different operational states.
Figure 5B:
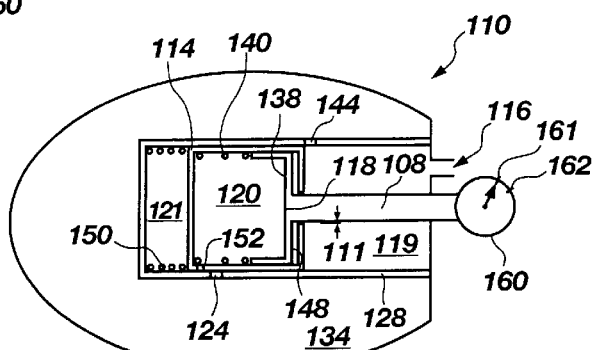

FIGS. 5A–5E illustrate cross-sectional schematic views of the incremental pressurization fluctuation counter 110 embodiment shown in FIG. 4A during operation. As shown in FIG. 5A, during filling of the container 132, pressure and/or momentum of the flow of material (liquid or gas) entering through fill port 116 may cause the shuttle valve 114 to be displaced so that fill aperture 144 is opened and the material may enter the container 132 therethrough. Depending on the biasing properties of the biasing element 140 and the biasing member 150 as well as the size of the gap 111, the shuttle valve 114 may be displaced initially in relation to the movable element 118 as shown in FIG. 5B during filling of container 132. Conversely, the movable element 118 may also move with the shuttle valve 114 and may be displaced against biasing element 140 due to pressure within fill annulus 119 that communicates with the surface 148 of movable element 118 via gap 111 during filling of container 132. In either case, shuttle valve 114 may be displaced so that the chamber aperture 152 may not be aligned with the vent aperture 124, thus isolating chamber 120 from communication with the container chamber 134 as container 132 is filled. As a further consideration, pressure may also develop within space 121 as shuttle valve 114 is displaced toward biasing member 150. Therefore, pressure within space 121 may be predicted and/or designed, or space 121 may be vented to communicate with chamber 120 so that pressure within space 121 and chamber 120 may be dependent on the position of movable element 118.

Figure 5C:
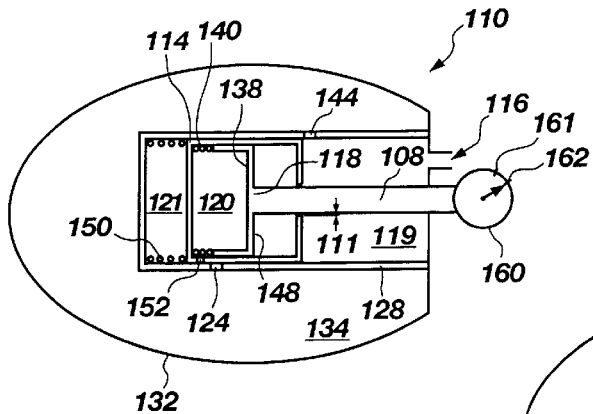

As the container 132 is filling, pressure within the container chamber 134 as well as the fill annulus 119 may build and the movable element 118 may be laterally displaced in relation to the shuttle valve 114, as shown in FIG. 5C. Gap 111 may be sized to be relatively small to prevent the movable element 118 from being displaced at a high rate of speed, either due to pressure developed within annulus 119 or pressure within chamber 120. Shuttle valve 114 may be limited in its movement toward biasing member 150 to prevent damage thereof and may also be limited in its movement away from biasing member 150 to ensure that chamber aperture 152 may become aligned with vent aperture 124.

The overall displacement of the movable element 118 may be determined by the biasing properties of biasing member 150 and biasing element 140 as well as the position of the movable element 118 and the shuttle valve 114 as determined at least partially by the pressures experienced by surface 138 and surface 148 and the areas thereof during operation of the incremental pressurization fluctuation counter 110. As may be seen by FIGS. 5A–5E, the biasing element 140 and biasing member 150 may act in an additive manner. Therefore, the incremental pressurization fluctuation counter 110 may be configured so that the indicator 160 indicates an incremental pressure fluctuation when the pressure developed within the container chamber 134 reaches a selected minimum magnitude in excess of an initial pressure that may be sealed within the chamber 120 upon the shuttle valve 114 being displaced to open fill aperture 144. FIG. 5C shows that indicator 160 may be incremented to display indicium 162, whereas prior to (FIGS. 5A and 5B) pressurization of container chamber 134 to a selected minimum incremental pressure increase, indicator 160 displayed indicium 161.

Figure 5D:
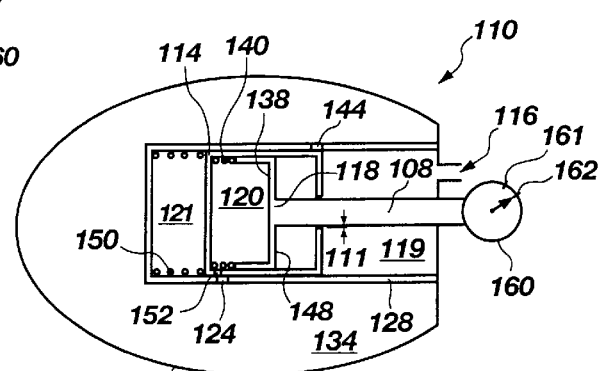
Figure 5E:
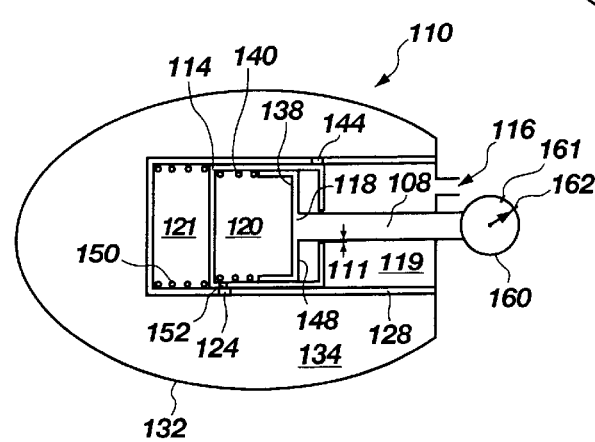

Turning to FIG. 5D, as filling ceases and the pressure and/or momentum of the filling material fails to bias the shuttle valve 114 so as to open the fill aperture 144, the chamber aperture 152 may correspond with vent aperture 124, thus allowing chamber 120 to communicate with container chamber 134. Moreover, as the pressures within chamber 120 and container chamber 134 equalize, the biasing element 140 may cause the movable element 118 to return to its position as shown in FIG. 5E. Also upon the pressure within chamber 120 and the container chamber 134 equalizing, the indicator 160 may become capable of displaying subsequent incremental pressure fluctuations.

Figure 4B:
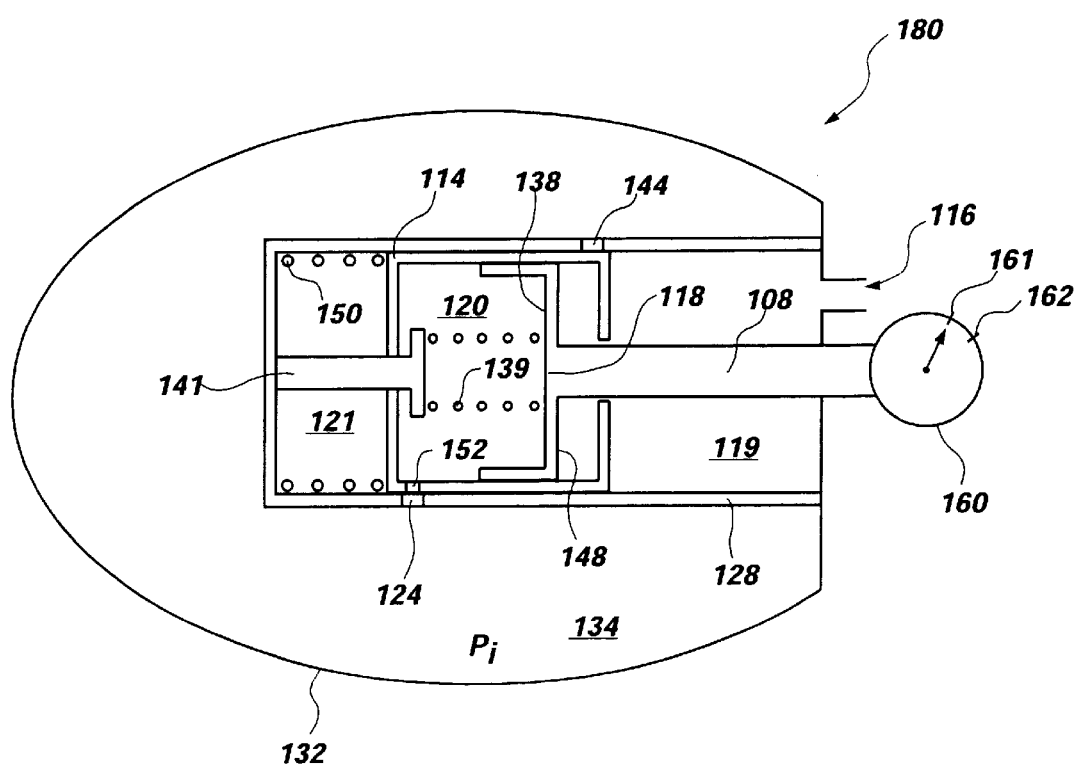
FIG. 4B is a schematic side cross-sectional view of an embodiment of an incremental pressurization fluctuation counter of the present invention.

In another embodiment, the biasing element 140 may be mechanically isolated from the biasing member 150, so that the movement of the movable element 118 may not be influenced by the biasing member 150 during operation, and particularly during movement of the shuttle valve 114. For instance, as shown in FIG. 4B of incremental pressurization fluctuation counter 180, a support member 141 may extend from the housing 128, through the shuttle valve 114, and support the biasing element 139. Thus, the movable element 118 may not be influenced by the position of the shuttle valve 114 by way of the biasing member 150. The operation of the incremental pressurization fluctuation counter 180 embodiment shown in FIG. 4B is generally similar to the operation as shown and described in FIGS. 5A–5E, except that the movement of (or force applied to) the shuttle valve 114 via the biasing member 150 does not influence the movement of (or force applied to) the movable element 118. Decoupling the shuttle valve 114 and movable element 118 may be desirable for ease of design and ease of replacement and/or reconfiguration of the incremental pressurization fluctuation counter 180. Other elements labeled in FIG. 4B are numbered according to the elements as described hereinabove in relation to FIG. 4A.

Figure 6A:
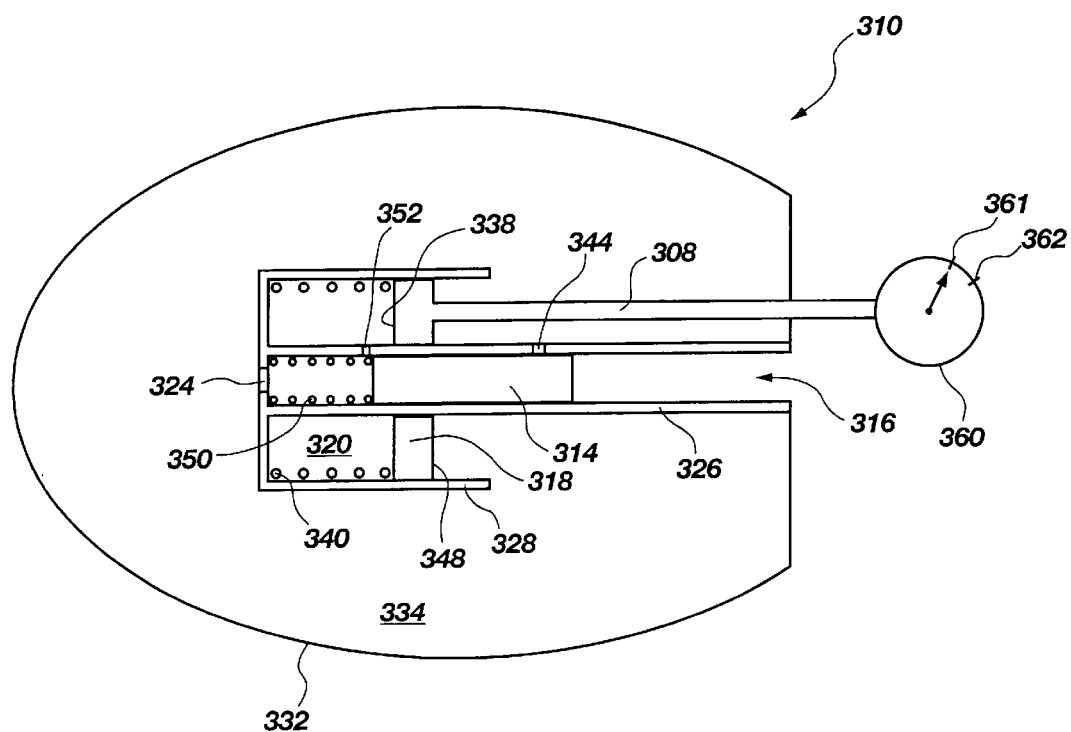
FIG. 6A is a schematic side cross-sectional view of an embodiment of an incremental pressurization fluctuation counter of the present invention.

In yet another embodiment, FIG. 6A shows an incremental pressurization fluctuation counter 310 wherein the movable element 318 comprises an annular piston operably connected to indicator 360 via extending element 308. Shuttle valve 314 may be configured to move within the interior of the movable element 318. As such, the fill port 316 may form the housing 326 for the shuttle valve 314. Outer housing 328 may form chamber 320 in conjunction with surface 338 of movable element 318. Outer housing 328 and housing 326 may be integrally formed, or may be threaded, welded, or otherwise affixed to one another as known in the art. Vent aperture 324 may allow for the container chamber 334 to communicate with the chamber 320 and may also prevent the container chamber 334 from communicating with the fill port 316 when the shuttle valve 314 is positioned accordingly. Shuttle valve 314 may allow for the fill port 316 to communicate with the container chamber 334 and may prevent communication of the container chamber 334 with the chamber 320. As may be seen in FIG. 6A, the pressure within chamber 320 and container chamber 334 may be substantially equal when the container 332 is closed or when material within the tank exits through an exit port (not shown).

Figure 6B:
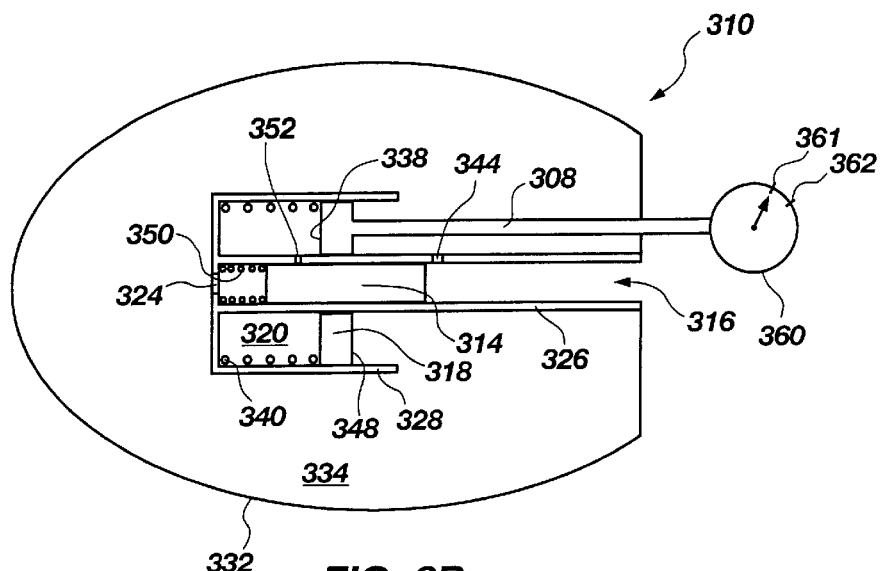
FIGS. 6B–6D are side cross-sectional views of the embodiment of an incremental pressurization fluctuation counter as shown in FIG. 6A in different operational states.
Figure 6C:
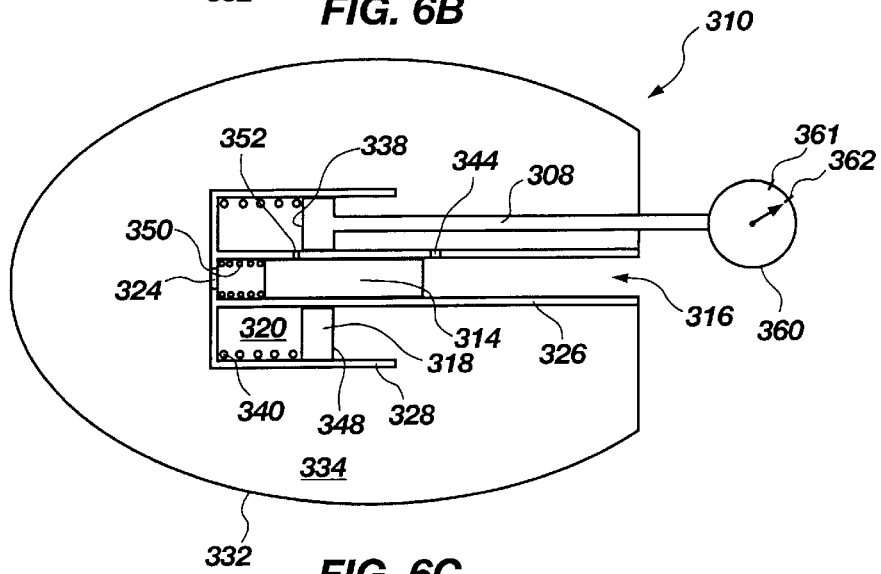
Figure 6D:
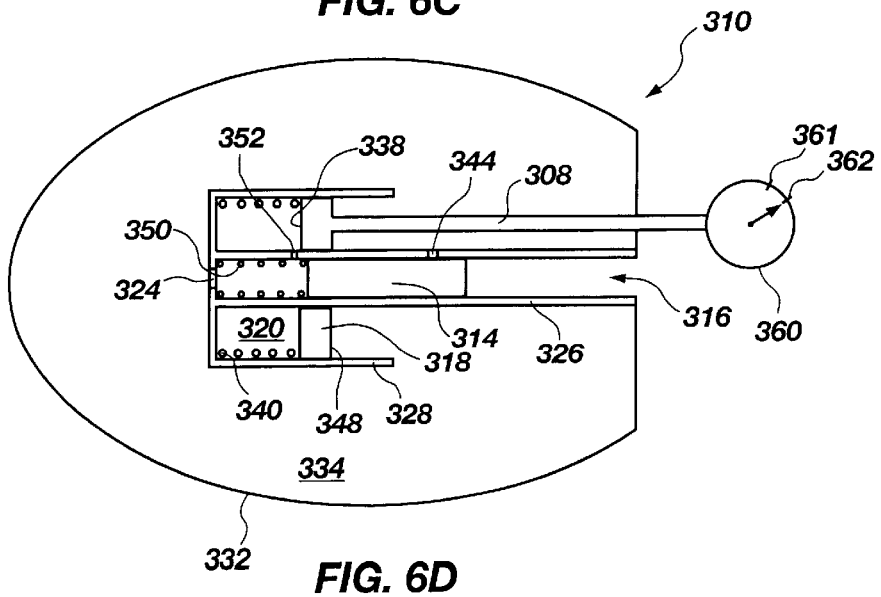

FIGS. 6B–6D show the incremental pressurization fluctuation counter 310 in different operational states. FIG. 6B illustrates that as the container 332 is filled, pressure within fill port 316 may cause the shuttle valve 314 to be biased toward biasing member 350 so that fill aperture 344 may be opened and material may enter therethrough into the container 332. FIG. 6C illustrates that as pressure within container chamber 334 increases during filling of container 332 over the initial pressure sealed within chamber 320, the movable element 318 may be biased against the biasing element 340 by the force developed by pressure acting on surface 348. Thus, indicator 360 may increment via extending element 308 to display an incremental pressure fluctuation as illustrated by the indicator 360 displaying a first indicium 361 in FIGS. 6A and 6B and a second indicium 362 in FIGS. 6C and 6D. FIG. 6D shows that when filling ceases, the shuttle valve 314 may seal fill aperture 344 and also allow communication of container chamber 334 with chamber 320 by way of vent aperture 324 in conjunction with chamber aperture 352, whereby the movable element 318 may be biased by way of biasing element 340 and positioned as shown. Thus, subsequent and repeated incremental pressure fluctuations of sufficient magnitude may be indicated similarly.

As may be seen from the preceding embodiments of the present invention, many different configurations of the incremental pressurization fluctuation counter may be possible. The block diagrams shown in FIGS. 7A and 7B further illustrate the present invention. More particularly, the valve mechanism 454 may allow the container chamber 434 to communicate with the chamber 420 by way of connecting port 407 to port 409, the chamber 420 communicating with interface 417 of movable element 418. Interface 417 of movable element 418 is sealed from interface 419 of movable element 418, so that a pressure difference therebetween may cause the movable element 418 to move. Therefore, the valve mechanism 454 may be located remotely in relation to the container (not shown) as well as the chamber 420. In addition, the movable element 418 may be located away from the chamber 420, so long as the chamber 420 may communicate pressure thereto. In a first operational state of the valve mechanism 454 shown in FIG. 7A, the valve mechanism 454 allows for communication between the container chamber 434 and the chamber 420, while preventing either the container chamber 434 or the chamber 420 from communicating with the inlet port 416. In a second operational state of the valve mechanism 454 shown in FIG. 7B, the valve mechanism 454 allows for communication of the inlet port 416 with port 409 and therethrough with the container chamber 434 while preventing communication between port 407 and either the inlet port 416 or port 409.

Figure 7A:
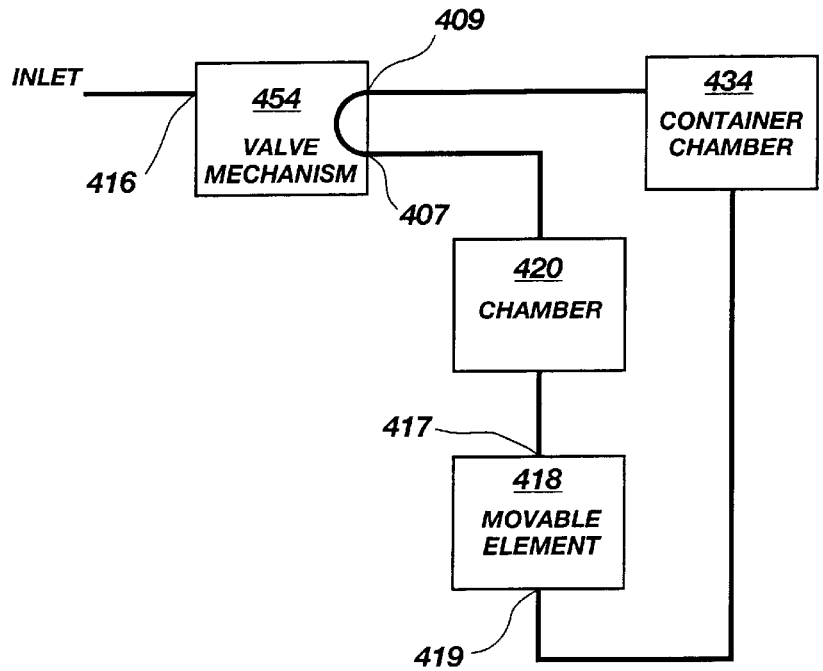
FIG. 7A is a block diagram illustrating the relationship between the valve mechanism, the chamber, the movable element, and the container chamber when the valve mechanism is in a first operational state.
Figure 7B:
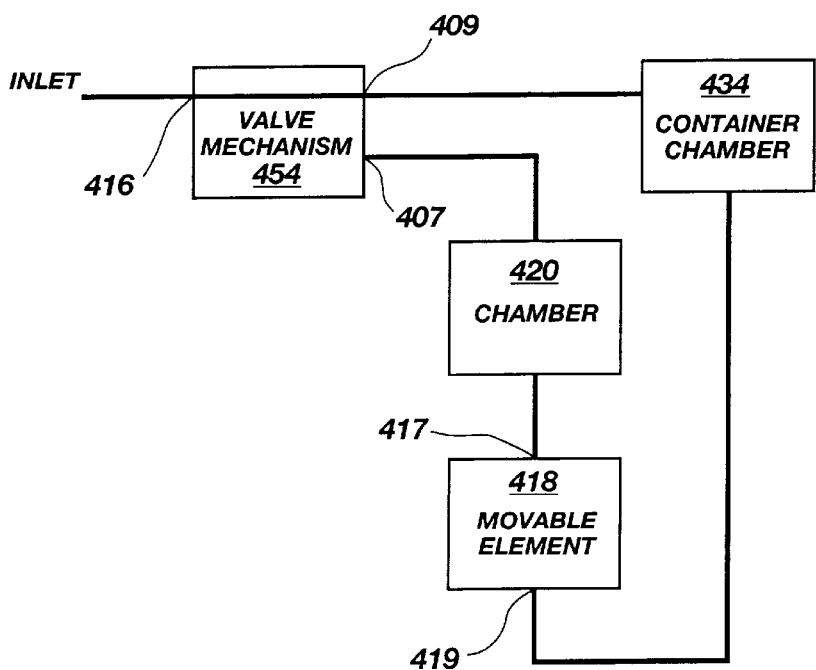
FIG. 7B is a block diagram illustrating the relationship between the valve mechanism, the chamber, the movable element, and the container chamber when the valve mechanism is in a second operational state.

Operating states other than those shown in FIGS. 7A and 7B are contemplated by the present invention. For instance, inlet port 416, port 409, and port 407 may be connected to one another simultaneously. Such a configuration may be used if the incremental pressurization fluctuation counter is intended to measure incremental pressure fluctuations by way of a pressure within a sealed chamber exceeding the pressure within the container. Alternatively, none of the inlet port 416, port 409, or port 407 may be connected. Also, port 407 may be connected to inlet port 416. In addition, minimum connection or isolation times may be implemented so that if isolation or connection between any two ports occurs, it lasts for a predetermined amount of time in relation to a pressure or other condition. Such a configuration may be implemented to reduce the sensitivity of the incremental pressurization fluctuation counter to certain operating conditions. For instance, if port 407 is isolated from any other port, it may be isolated for a minimum amount of time after the pressure in the inlet port decreases. Such a configuration may allow for the filling of a container to be interrupted, while preventing the pressure within the container and the chamber from equalizing.

The valve mechanism 454 may be a shuttle valve, or may be any other type of valve as known in the art. Moreover, the valve mechanism 454 may be actuated manually, electrically, pneumatically, hydraulically, or as otherwise desired and may include check valves, plungers, balls, biasing elements, and sealing members as known in the art and desired for operational performance. Of course, the valve mechanism 454 may comprise several individual valves that are actuated in relation to one another in order to achieve the function of the valve mechanism 454 as described herein. In addition, it may be desirable to install a valve or a vent (not shown) to atmospheric pressure between the movable element 418 and the chamber 420 and/or between the movable element 418 and the container chamber 434 for diagnostic purposes.

Figure 8A:
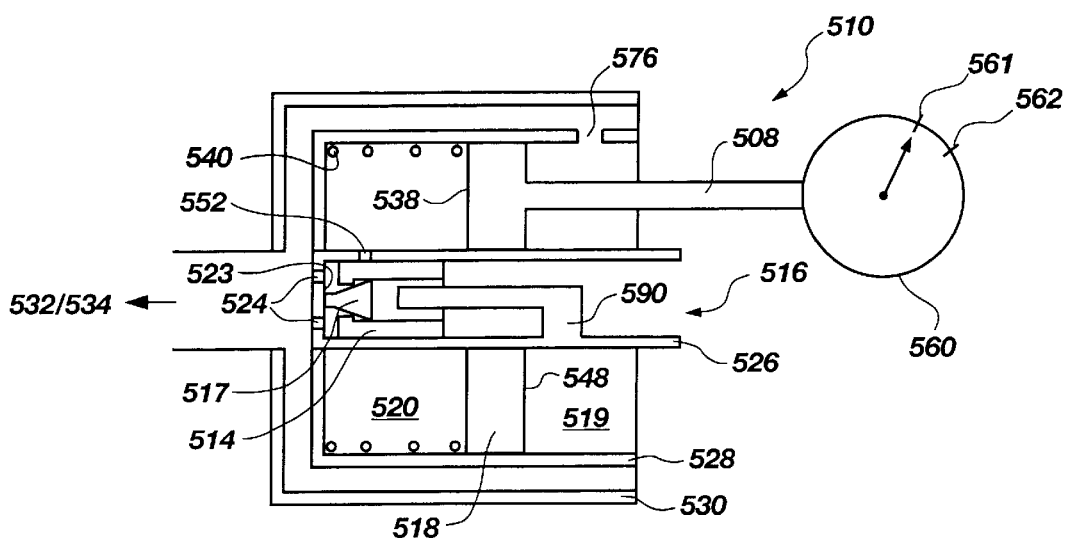
FIGS. 8A–8C are schematic side cross-sectional views of another embodiment of an incremental pressurization fluctuation counter of the present invention in different operational states.

Accordingly, as shown in FIG. 8A, the present invention contemplates that the incremental pressurization fluctuation counter 510 may be located external to the container 532. Shuttle valve 514 located within tube 526 and including check valve 517 may allow for the container chamber 534 to be filled via vent apertures 524. For example, pressure in excess of the pressure within the container chamber 534 may cause the shuttle valve 514 to be forced toward the vent apertures 524, whereby the check valve 517 matingly engages the vent wall 523 and the check valve 517 may be displaced in relation to the shuttle valve 514 so that material entering the fill port 516 may pass through the interior of the shuttle valve 514, pass through or around the check valve 517, through vent apertures 524, and into the container 532.

Figure 8B:
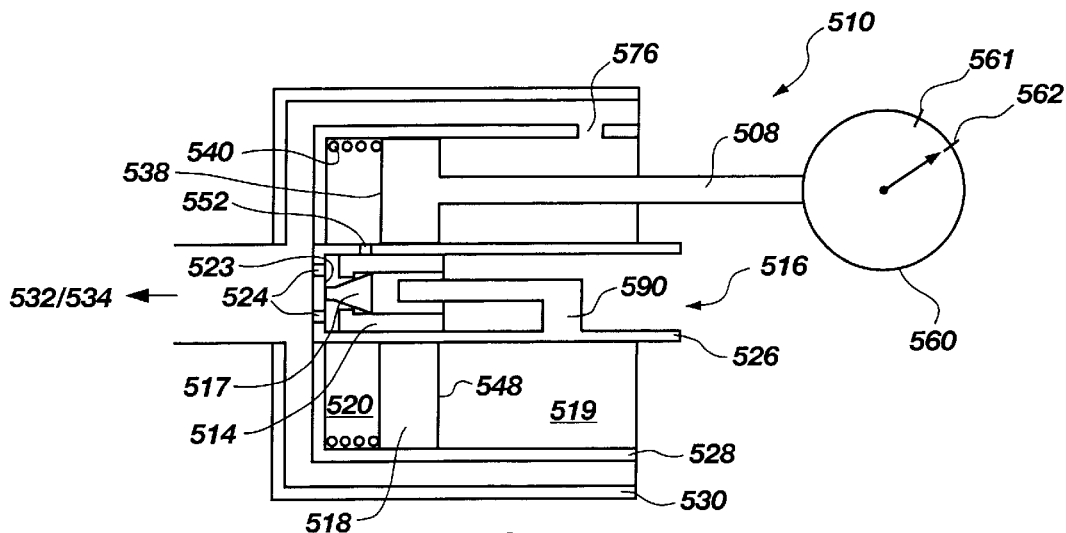

In addition, chamber aperture 552 is sealed as material enters the container 532, so that chamber 520 may be isolated from the increasing incremental pressure within the container chamber 534. The container chamber 534 communicates with annulus 519 via both the gap formed between the outer casing 530, the housing 528 as well as port 576 so that pressure within the container chamber 534 may act upon the surface 548 of movable element 518 to force the movable element 518 against the biasing element 540 and against the pressure sealed and/or developed within the chamber 520. Such displacement may cause the indicator 560 to increment via extending element 508 affixed to movable element 518 if the displacement is of a sufficient magnitude. As may be seen, the magnitude of the displacement may be selected by the biasing properties of the biasing element 540, the area of the surface 548, the area of surface 538, and the pressures experienced, as well as other considerations. Thus, an incremental pressure increase of at least a selected magnitude within the container chamber 534 may cause the indicator 560 to display the incremental pressure fluctuation by causing indicator 560 to increment from indicium 561 to indicium 562 as shown in FIG. 8B in comparison to FIG. 8A.

Figure 8C:
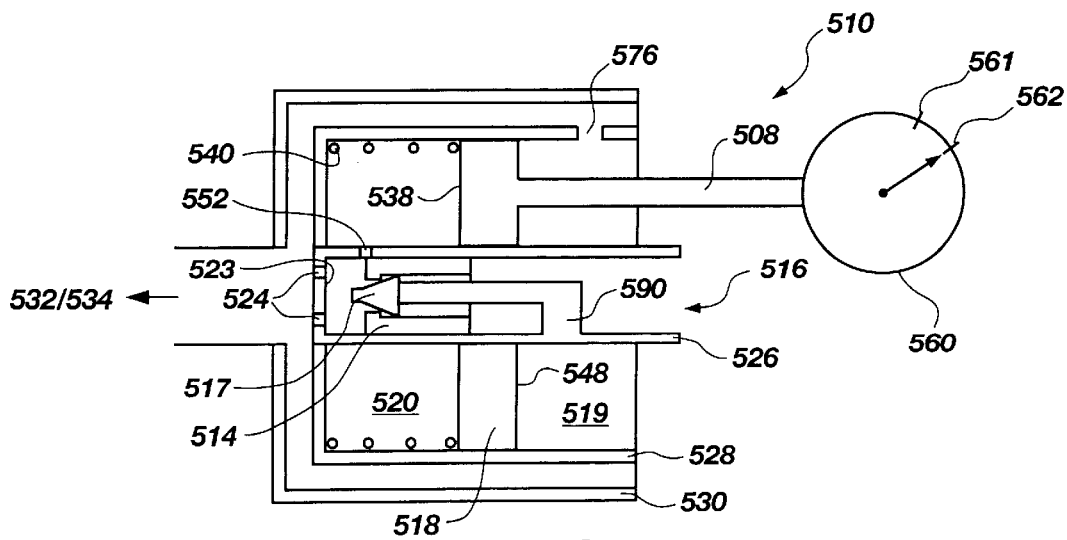

Further, as shown in FIG. 8C, after filling the container 532, as pressure within fill port 516 decreases, the shuttle valve 514 may be forced laterally away from the vent apertures 524 whereby plunger 590 may engage the check valve 517 and seat the check valve 517 within the shuttle valve 514 so that material is prevented from exiting the container chamber 534 through the check valve 517. Of course, as illustrated in other embodiments of the present invention, a biasing element (not shown) may be utilized to ensure that the shuttle valve 514 allows vent apertures 524 to communicate with chamber aperture 552 when pressure within the fill port 516 is sufficiently low in relation to the pressure within container chamber 534.

Incremental pressure fluctuations subsequent to the substantial equalization of the pressures within chamber 520 and container chamber 534 may be recorded and/or indicated as they may occur.

As may also be seen from the foregoing description, many variations and configurations of containers, movable elements, indicators, valve mechanisms, shuttle valves and other incremental pressurization fluctuation counter apparatus components may be possible. Therefore, although the foregoing description contains many specifics, these should not be construed as limiting the scope of the present invention, but merely as providing illustrations of some exemplary embodiments. Similarly, other embodiments of the invention may be devised which do not depart from the spirit or scope of the present invention. Features from different embodiments may be employed in combination with one another. The scope of the invention is, therefore, indicated and limited only by the appended claims and their legal equivalents, rather than by the foregoing description. All additions, deletions, and modifications to the invention, as disclosed herein, which fall within the meaning and scope of the claims are to be embraced thereby.

What is claimed is:

1. An apparatus for indicating incremental pressure fluctuations, comprising:

a container having an inlet port;

a sealable chamber in communication with a movable element;

wherein the movable element is configured to move in response to an incremental pressure difference between pressure within the sealable chamber and pressure within the container;

a valve mechanism having a first operating state and at least a second operating state;

wherein the first and at least a second operating states of the valve mechanism control communication between any of the sealable chamber, the container, and/or the inlet port; and an indicator configured to indicate the number of times the incremental pressure difference exceeds a selected minimum incremental pressure differential.

2. The apparatus of claim 1, wherein the valve mechanism is configured to prevent the sealable chamber from communicating with the container in either the first or the at least a second operating state.

3. The apparatus of claim 2, wherein the valve mechanism is configured in the first operating state to allow communication between the inlet port and the container while preventing the sealable chamber from communicating with the container.

4. The apparatus of claim 3, wherein the valve mechanism is configured in the at least a second operating state to prevent communication between the inlet port and the container while allowing the sealable chamber to communicate with the container.

5. The apparatus of claim 2, wherein the valve mechanism is configured in the at least a second operating state to prevent communication between the inlet port and the container while preventing the container from communicating with the sealable chamber.

6. The apparatus of claim 5, wherein the valve mechanism is configured in the first operating state to allow communication between the inlet port, the container, and the sealable chamber.

7. The apparatus of claim 1, wherein the movable element comprises a piston.

8. The apparatus of claim 7, further comprising limit stops sized, configured, and positioned to limit the movement of the movable element.

9. The apparatus of claim 7, wherein the piston is selected from the group consisting of an annular piston and a multidiameter piston.

10. The apparatus of claim 1, further comprising a biasing element for biasing the movable element.

11. The apparatus of claim 10, wherein the biasing element is selected from the group consisting of a compression spring, a tension spring, a Belleville spring, and a torsional spring.

12. The apparatus of claim 10, wherein the biasing element comprises a pressure within the sealed chamber.

13. The apparatus of claim 1, wherein the movable element comprises a membrane.

14. The apparatus of claim 13, further comprising a support sized, configured, and positioned to limit deformation of the membrane.

15. The apparatus of claim 1, wherein the valve mechanism is configured to be actuated between either the first operating state or the at least second operating state by way of an actuation device.

16. The apparatus of claim 15, wherein the actuation device is selected from the group consisting of a solenoid, a lever, a shuttle valve, and a threaded element.

17. The apparatus of claim 4, wherein the valve mechanism is configured to be actuated to the first operating state by way of material entering the container.

18. The apparatus of claim 17, wherein the valve mechanism is configured to return to the at least a second operating state when material ceases to enter the container.

19. The apparatus of claim 18, wherein the valve mechanism comprises a shuttle valve.

20. The apparatus of claim 19, wherein
the first operating state of the shuttle valve comprises the shuttle valve exhibiting a first position; and
the at least a second operating state of the shuttle valve comprises the shuttle valve exhibiting a second position.

21. The apparatus of claim 20, wherein the first position comprises a range of positions and the second position comprises another range of positions.

22. The apparatus of claim 19, wherein the shuttle valve forms at least a portion of the sealable chamber.

23. The apparatus of claim 19, wherein the shuttle valve includes a check valve.

24. The apparatus of claim 1, wherein the indicator is configured to increment upon experiencing a displacement that exceeds a minimum amount of displacement.

25. The apparatus of claim 1, further comprising a second indicator configured to indicate the number of times the incremental pressure difference exceeds another selected minimum incremental pressure differential.

26. The apparatus of claim 6, wherein the valve mechanism is configured to be actuated to the first operating state by way of material entering the container.

27. The apparatus of claim 26, wherein the valve mechanism is configured to return to the at least a second operating state when the material ceases to enter the container.

28. The apparatus of claim 27, wherein the valve mechanism comprises a shuttle valve.

29. The apparatus of claim 28, wherein
the first operating state of the shuttle valve comprises the shuttle valve exhibiting a first position; and
the at least a second operating state of the shuttle valve comprises the shuttle valve exhibiting a second position.

30. The apparatus of claim 29, wherein the first position comprises a range of positions and the second position comprises another range of positions.

31. The apparatus of claim 28, wherein the shuttle valve forms at least a portion of the sealable chamber.

32. The apparatus of claim 28, wherein the shuttle valve includes a check valve.

33. The apparatus of claim 2, wherein the valve mechanism is configured in the first operating state to allow communication between the inlet port and the container.

34. The apparatus of claim 33, wherein the valve mechanism is configured in the at least a second operating state to prevent communication between the inlet port and the container while preventing the container from communicating with the sealable chamber.

35. The apparatus of claim 34, wherein the valve mechanism includes a third operating state configured to allow communication between the sealable chamber and the container.

36. A method for indicating an incremental pressure fluctuation comprising:
sealing a sealable chamber at an initial pressure;
changing a pressure within a container in relation to the initial pressure; and
indicating an incremental pressure difference between the initial pressure within the sealable chamber and the container pressure by way of the sealable chamber responding to the incremental pressure difference.

37. The method of claim 36, wherein changing the pressure within the container in relation to the initial pressure comprises increasing the pressure within the container in relation to the initial pressure by at least a selected incremental pressure.

38. The method of claim 37, further comprising equalizing the pressure within the container and the sealable chamber.

39. The method of claim 38, further comprising:
sealing the sealable chamber at another initial pressure;
changing the pressure within the container in relation to the another initial pressure; and
indicating another incremental pressure difference between the another initial pressure within the sealable chamber and the container pressure by way of the sealable chamber responding to the another incremental pressure difference.

40. The method of claim 36, wherein changing the pressure within the container in relation to the initial pressure comprises decreasing the pressure within the container in relation to the initial pressure by at least a selected incremental pressure.

41. The method of claim 40, further comprising equalizing the pressure within the container and the sealable chamber.

42. The method of claim 41, further comprising:
sealing the sealable chamber at another initial pressure;
changing the pressure within the container in relation to the another initial pressure; and
indicating another incremental pressure difference between the another initial pressure within the sealable chamber and the container pressure by way of the sealable chamber responding to the another incremental pressure difference.

43. The method of claim 36, wherein the sealable chamber responding to the incremental pressure difference comprises moving a portion of the sealable chamber.

44. The method of claim 43, wherein moving a portion of the sealable chamber comprises moving a piston.

45. The method of claim 44, wherein moving a piston comprises moving a piston selected from the group comprising an annular piston and a multidiameter piston.

46. The method of claim 44, further comprising biasing the piston against movement due to a pressure difference between the initial pressure within the sealable chamber and the container pressure.

47. The method of claim 37, further comprising equalizing the pressure within the container and the sealable chamber.

48. The method of claim 47, wherein equalizing the pressure within the container and the sealable chamber comprises sealing the container while allowing the sealable chamber to communicate with the container.

49. The method of claim 48, further comprising providing a shuttle valve configured with a first operating state allowing communication between an inlet and the container while preventing the sealable chamber from communicating with the container, and a second operating state preventing communication between the inlet and the container while allowing the sealable chamber to communicate with the container.

50. The method of claim 49, further comprising biasing the shuttle valve to the second operating state.

51. The method of claim 40, further comprising equalizing the pressure within the container and the sealable chamber.

52. The method of claim 51, further comprising providing a shuttle valve configured with a first operating state allowing communication between an inlet, the container, and the sealable chamber, and a second operating state preventing communication between an inlet and the container while preventing the container from communicating with the sealable chamber.

53. The method of claim 52, further comprising biasing the shuttle valve to the second position.

54. The method of claim 36, wherein indicating an incremental pressure difference comprises indicating an incremental pressure difference for any incremental pressure difference exceeding a selected minimum incremental pressure difference.

55. The method of claim 54, wherein indicating an incremental pressure difference comprises indicating an incremental pressure difference for any incremental pressure difference exceeding another selected minimum incremental pressure difference.

56. The method of claim 36, wherein indicating an incremental pressure difference comprises indicating an incremental pressure difference within a first range of incremental pressure differences.

57. The method of claim 56, wherein indicating an incremental pressure difference comprises indicating an incremental pressure difference within a second range of incremental pressure differences.

58. A method for designing an incremental pressure fluctuation counter comprising:
providing a container having an inlet;
providing a sealable chamber;
configuring the sealable chamber to respond to a difference in pressure between the sealable chamber and the container; and
configuring an indicator to indicate an incremental pressure fluctuation upon the sealable chamber responding to the difference in pressure between the sealable chamber and the container.

59. The method of claim 58, further comprising configuring a valve mechanism to control communication between any of the inlet, the sealable chamber, and the container.

60. The method of claim 59, wherein configuring a valve mechanism comprises configuring the valve mechanism with a first operating state that allows communication between the inlet and the container while preventing the sealable chamber from communicating with the container.

61. The method of claim 60, wherein configuring a valve mechanism further comprises configuring the valve mechanism with a second operating state that prevents communication between the inlet and the container while allowing the sealable chamber to communicate with the container.

62. The method of claim 61, further comprising configuring the valve mechanism to preferentially exhibit the second operating state.

63. The method of claim 59, wherein configuring a valve mechanism comprises configuring the valve mechanism with a first operating state that allows communication between the inlet, the container, and the sealable chamber.

64. The method of claim 63, wherein configuring a valve mechanism comprises configuring the valve mechanism with a second operating state that prevents communication between the inlet and the container while preventing the container from communicating with the sealable chamber. The method of claim 63, wherein configuring a valve mechanism comprises configuring the valve mechanism with a first operating state that allows communication between the inlet, the container, and the sealable chamber.

65. The method of claim 64, further comprising configuring the valve mechanism to preferentially exhibit occupying the second operating state.

66. The method of claim 58, wherein configuring the sealable chamber to respond to a difference in pressure between the sealable chamber and the container comprises configuring a portion of the sealable chamber to move in response to a difference in pressure between the sealable chamber and the container.

67. The method of claim 66, wherein configuring a portion of the sealable chamber to move in response to a difference in pressure between the sealable chamber and the container comprises configuring a piston to move in response to the difference in pressure between the sealable chamber and the container.

68. The method of claim 67, wherein configuring a piston to move in response to a difference in pressure between the sealable chamber and the container comprises configuring a piston selected from the group comprising an annular piston and a multidiameter piston.

69. The method of claim 68, further comprising selecting a biasing element to bias the piston against movement due to a pressure difference between an initial pressure within the sealable chamber and the pressure within the container.

70. The method of claim 69, further comprising tailoring the biasing element according to a predicted incremental pressure fluctuation.

71. The method of claim 58, wherein configuring the indicator to indicate the incremental pressure fluctuation comprises configuring an indicator to increment in response to a minimum incremental pressure fluctuation magnitude between the sealable chamber and the container.

72. The method of claim 58, wherein configuring the indicator to indicate an incremental pressure fluctuation comprises configuring the indicator to increment in response to an incremental pressure difference exceeding a selected minimum incremental pressure difference.

73. The method of claim 72, wherein configuring the indicator to indicate an incremental pressure fluctuation comprises configuring the indicator to increment in response to an incremental pressure difference exceeding another selected minimum incremental pressure difference.

74. The method of claim 58, wherein configuring the indicator to indicate an incremental pressure fluctuation comprises configuring the indicator to increment within a first range of incremental pressure differences.

75. The method of claim 74, wherein configuring the indicator to indicate an incremental pressure fluctuation comprises configuring the indicator to increment within a second range of incremental pressure differences.

76. The method of claim 59, wherein configuring the valve mechanism comprises configuring the valve mechanism to allow for equalization of pressure within the container and pressure within the sealable chamber.

* * * * *

UNITED STATES PATENT AND TRADEMARK OFFICE
CERTIFICATE OF CORRECTION

PATENT NO. : 6,959,605 B2　　　　　　　　　　　　　　　　　　　　　　　　Page 1 of 1
APPLICATION NO. : 10/377273
DATED : November 1, 2005
INVENTOR(S) : Shawn R. Comstock, George R. Melvick and Alan L. Godfrey It is certified that error appears in the above-identified patent and that said Letters Patent is hereby corrected as shown below:

| | |
|---|---|
| CLAIM 1, COLUMN 14, LINE 56, | change "the number" to --a number-- |
| CLAIM 8, COLUMN 15, LINE 17, | change "limit the" to --limit-- |
| CLAIM 44, COLUMN 17, LINE 15, | change "moving a" to --moving the-- |
| CLAIM 45, COLUMN 17, LINE 17, | change "moving a" to --moving the-- |
| CLAIM 54, COLUMN 17, LINE 52, | change "an" to --the-- |
| CLAIM 55, COLUMN 17, LINE 57, | change "an" to --the-- |
| CLAIM 56, COLUMN 17, LINE 62, | change "an" to --the-- |
| CLAIM 57, COLUMN 17, LINE 66, | change "an" to --the-- |
| CLAIM 60, COLUMN 18, LINE 16, | change "a valve" to --the valve-- |
| CLAIM 61, COLUMN 18, LINE 21, | change "a valve" to --the valve-- |
| CLAIM 63, COLUMN 18, LINE 29, | change "a valve" to --the valve-- |
| CLAIM 64, COLUMN 18, LINE 33, | change "a valve" to --the valve-- |
| CLAIM 66, COLUMN 18, LINE 45, | change "to a" to --to the-- |
| CLAIM 66, COLUMN 18, LINE 48, | change "to a" to --to the-- |
| CLAIM 67, COLUMN 18, LINES 50, 51, | change "a portion" to --the portion-- |
| CLAIM 68, COLUMN 18, LINE 56, | change "a piston" to --the piston-- |
| CLAIM 68, COLUMN 18, LINES 58, 59, | change "a piston" to --the piston-- |
| CLAIM 72, COLUMN 19, LINE 7, | change "indicate an" to --indicate the-- |
| CLAIM 73, COLUMN 19, LINE 12, | change "indicate an" to --indicate the-- |
| CLAIM 74, COLUMN 20, LINE 2, | change "indicate an" to --indicate the-- |
| CLAIM 75, COLUMN 20, LINE 6, | change "indicate an" to --indicate the-- |

Signed and Sealed this

Thirtieth Day of November, 2010

David J. Kappos
*Director of the United States Patent and Trademark Office*